Figure 1:
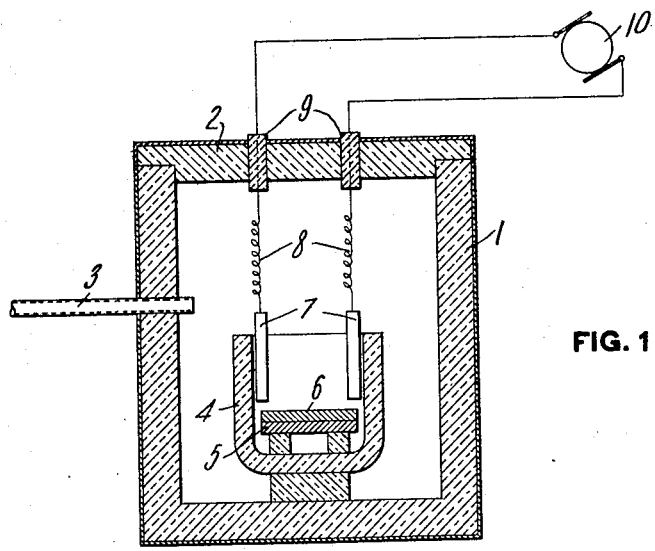

J. H. L. DE BATS.
METHOD OF WELDING.
APPLICATION FILED AUG. 18, 1913.

1,152,610.

Patented Sept. 7, 1915.

WITNESSES

INVENTOR
Jean Hubert Louis De Bats
By Fredk H. Winter
his attorney

UNITED STATES PATENT OFFICE.

JEAN HUBERT LOUIS DE BATS, OF ZELIENOPLE, PENNSYLVANIA.

METHOD OF WELDING.

1,152,610.  Specification of Letters Patent.  Patented Sept. 7, 1915.

Application filed August 18, 1913. Serial No. 785,391.

*To all whom it may concern:*

Be it known that I, JEAN HUBERT LOUIS DE BATS, a resident of Zelienople, in the county of Butler and State of Pennsylvania, have invented a new and useful Improvement in Methods of Welding, of which the following is a specification.

This invention relates to a method of welding dissimilar metals, such as comparatively hard and soft metals to each other.

The invention is primarily adapted for welding copper or aluminum to iron or steel, but may also be practised for welding to any hard metal, such as iron, nickel, steel or the like, a comparatively soft metal, such as copper, zinc, silver or gold.

The object of the invention is to provide a simple method of welding hard and soft metals which can be practised economically and with simple apparatus and which will secure a good weld or union between the hard and soft metals.

The invention also has for its object to provide a method of welding hard and soft metals which will prevent the access of oxygen to the contacting surfaces of the two metals, thereby preventing corrosion thereof or the formation of films of oxid thereupon and insuring that the contacting surfaces of the two metals will be clean and in the best condition to unite with each other.

Briefly stated, the method consists in bringing surfaces of the two dissimilar metals which are clean or free from corrosion into contact with each other in a vacuum or partial vacuum, and then heating the metals, while in said vacuum, to a temperature at or near the melting point of the softer metal. This temperature may be slightly above or slightly below the true melting point. The vacuum in the container within which the metals are heated has the effect of opening up the pores or interstices between the particles or molecules of the harder metal, so that the surface or skin thereof, when heated, has an affinity for the softer metal. The soft metal is consequently attracted to the hard metal and when the welding temperature is reached runs into and fills all of its pores or interstices and produces a thorough intermingling or union between the skin or surface particles of the two metals, thereby producing a good weld.

The method may be carried out with or without pressure, and if pressure is used it may be applied in any desired manner, preferably, however, while the metals are still in the vacuum or partial vacuum. It may also be utilized for welding together dissimilar metals in the form of sheets or plates, or for providing articles formed of one metal, such as the harder metal, with a coating of the other metal. Such articles may be of any shape or form, such as sheets, plates, bar, tubes, castings, or the like.

Figure 2:
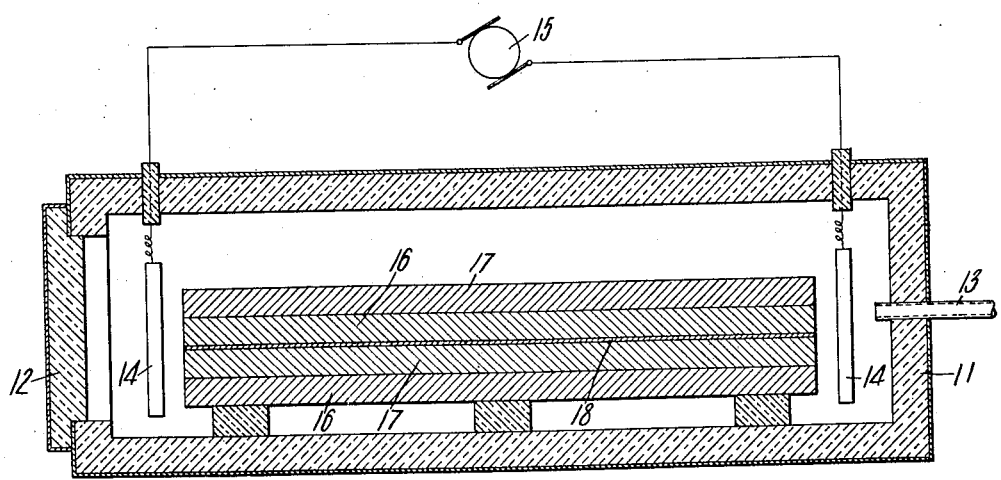

In the drawings, which illustrate suitable forms of apparatus for carrying out the invention, Figure 1 is a sectional elevation, showing apparatus for welding together sheets or plates of two dissimilar metals; and Fig. 2 is a similar view, showing apparatus for welding together large, heavy plates, such as armor-plate or the like.

In practising the method the two metals are first brought into contact with each other in such manner that there will be no film or coating of oxid or scale on the contacting surfaces. This may be accomplished in several ways. When plates of two dissimilar metals are to be welded together the surfaces to be brought into contact may be cleaned by means of a sand blast, or by pickling, or the metals may be applied to each other as soon as formed into sheets, so there will be no opportunity for corrosion. In other cases, as when a tube or bar is to be provided with a thin coating of a different metal, the tube or bar, if corroded, is first cleaned by a sand blast or by pickling, and is then provided with a coating of the other metal in an electrolytic plating cell, the current being so regulated as to secure a firm adherent coating of the proper thickness. The coating metal may also be applied to the base metal by rubbing it on with friction, or as a powder, or may even be applied as a paste by painting it on. The two metals, in contact with each other, as described, are now placed within an air-tight furnace or container, provided with suitable means whereby the air may be exhausted therefrom. When a vacuum or partial vacuum of the proper degree has been produced within the container or furnace the two metals, in contact with each other therein, are heated to a temperature at or near the melting point of the softer metal. This may be done in any suitable manner, but preferably by means of electrodes located within the container or furnace and so connected to an outside source of current that an arc may be produced between said electrodes sufficient to heat the metals to the proper temperature. The current is passed through the electrodes for a sufficient time to enable the coating metal to enter and fill the pores or interstices of the harder metal, so that there will be a thorough intermingling or welding of the two metals together. This is especially the case when the two metals have been brought into contact with each other by electroplating or painting, as described above. When the two dissimilar metals are in the form of sheets or plates, or are of some thickness, it may be desirable to assist the welding operation by pressure applied to the two metals. This may be accomplished in any desired manner, but preferably before the metals are removed from the vacuum. One way in which this can be done is by making the furnace or container for holding the two metals of sufficient size so that a rolling mill or power press may be contained therein, said mill or press being so arranged that it can be manipulated and controlled from without the container or furnace, supplemental mechanism being also included in the container for lifting the pairs of plates or compound articles 2 and feeding them into the mill; and when compressed receiving them therefrom. The metals may be heated electrically or, one of the rolls may be heated and the metals heated by conduction as they pass therethrough.

The apparatus shown in Fig. 1 comprises a container or furnace 1, which may be of any suitable size, proportions and shape, and which is preferably made of refractory material with a metal jacket. Said furnace is provided with a cover or doorway 2, which is suitably arranged so that it may be tightly sealed over the opening in the container, thereby making the same air-tight. A pipe or conduit 3 communicates with the space or within the furnace and at its outer end is arranged for connection to a suitable source of suction, so that the air may be exhausted from the container and a vacuum or partial vacuum produced therein.

4 represents a heating crucible, which is supported within the container and is arranged to hold the two dissimilar metals in contact with each other.

5 represents a plate or sheet of one of said metals, which may be formed of steel, iron, nickel or the like, and upon which is superposed a plate or sheet 6 of the other or softer metal, which may be copper, zinc, aluminum, gold, silver or the like.

The electrodes for producing an arc and thereby heating the two metals are shown at 7 and are connected to leads 8, which extend outwardly through clay pipes or tubes 9 to the outside of the furnace, where they are connected to a suitable generator or other source of current 10.

In use of this apparatus the plates of the two dissimilar metals, if corroded, are first cleaned, and are then placed in contact with each other within the crucible 4, while the latter is lying within the furnace 1. The cover or doorway 2 is then tightly sealed upon the furnace and the air therein is exhausted through the conduit 3. The electric current is then turned on and an arc is formed between the electrodes 7. This may be accomplished in any suitable manner as by bringing the electrodes together and then separating them. The arc produces heat sufficient to bring the temperature of the two metals up to the welding temperature, that is, to a temperature at or near the fusing point of the softer metal. When this occurs there is a free intermingling of the particles or molecules along the contacting surfaces of the two metals and a good weld or union results.

Tubes, bars or rods, or other articles may be provided with coatings in the same manner just described. In this case a tube, bar or the like, formed of one metal, such as hard steel or iron, may be provided with a coating of the other metal, such as soft copper or the like, and is then placed within the container and heated in a vacuum. The coating metal may be in the form of a thin sheet or film applied mechanically to the base metal or may be plated on electrically or painted on as described. In either case, when the metals are heated to the proper temperature in the vacuum, as described, the two metals become thoroughly intermingled and welded together.

Fig. 2 illustrates another form of apparatus suitable for forming armor-plate or the like. This comprises a long, shallow furnace or container 11 having a door 12 which may be tightly sealed thereon, and which container is provided with a pipe or conduit 13 by means of which the air therein may be exhausted to produce a vacuum or partial vacuum. Electrodes 14 are mounted at the opposite ends of said furnace and connected electrically to a suitable source of current 15. The sheets of metal to form the armor-plate are first piled in the furnace upon each other. As shown, each sheet or plate 16 of steel has superposed thereon a sheet or plate 17 formed of copper, bronze or the like. Successive pairs of superposed plates may be separated from each other by thin layers 18 of refractory material, such as powdered silica or the like, to prevent them from welding or fusing together. After the air is exhausted from the furnace the current is turned on and the plates subjected to a slow soaking heat which penetrates entirely through the plates and heats them evenly and uniformly throughout. The plates are heated in this manner up to about the melting point of the copper or bronze so that the latter will flow readily into the pores or interstices on the surface of the steel plates. The plates weld together entirely by their own weight and it is usually unnecessary to subject them to pressure. After the plates have been heated for a sufficient length of time the current is turned off and the plates allowed to cool in the vacuum after which they are withdrawn from the furnace and worked or rolled to the shapes desired.

What I claim is:—

1. The method of welding dissimilar metals, consisting in heating the same in contact with each other in a vacuum to a welding temperature and thereby preventing corrosion of the contacting surfaces of the two metals and causing the particles of the two metals along the contacting surfaces to intermingle and unite with each other.

2. The method of welding relatively hard and soft metals, consisting in bringing clean surfaces of said metals into contact with each other in a vacuum, heating said metals while in said vacuum to a temperature near the melting point of the soft metal, and then allowing said metals to cool in said vacuum.

3. The method of welding relatively hard and soft metals, consisting in heating said metals while in contact with each other in a vacuum, and applying pressure to said metals to cause the particles along the contacting surfaces thereof to intermingle and unite with each other.

4. The method of welding relatively hard and soft metals, consisting in heating said metals while in contact with each other in a vacuum, applying pressure to said metals while in said vacuum to cause the particles along the contacting surfaces thereof to intermingle and unite with each other, and allowing said metals to cool while in said vacuum.

In testimony whereof, I have hereunto set my hand.

JEAN HUBERT LOUIS DE BATS.

Witnesses:
 ALFRED G. ZEHNER,
 JACOB RAEBER.